May 27, 1969  P. J. MITCHELL, JR  3,445,906
CONSTRUCTION OF ROLL FOR MACHINERY
Filed Sept. 7, 1966
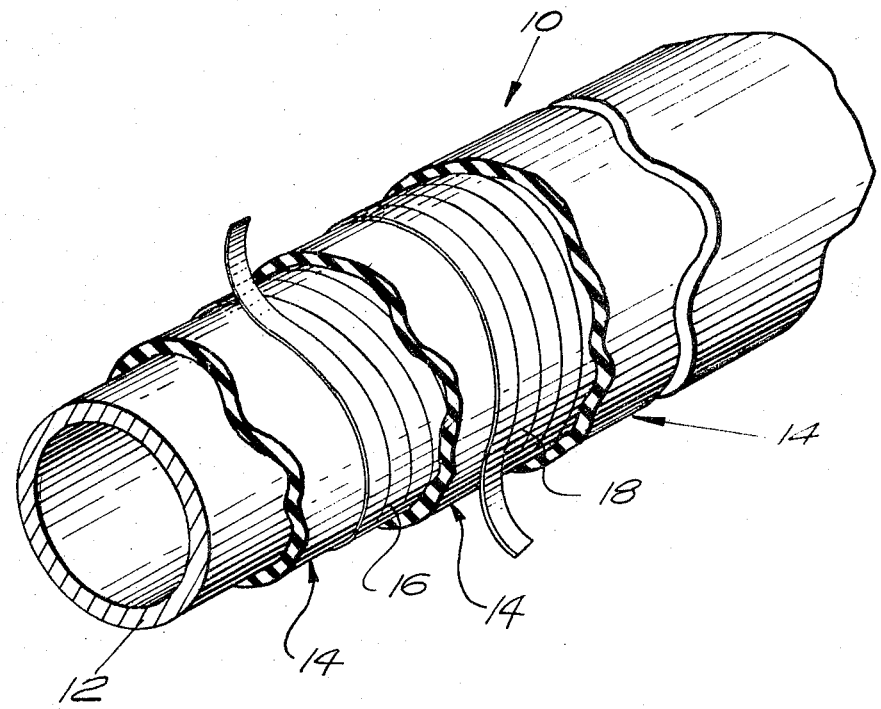
INVENTOR.
Paul J. Mitchell, Jr.
BY
Morse, Altman & Oates
ATTORNEYS

United States Patent Office 3,445,906
Patented May 27, 1969

3,445,906
CONSTRUCTION OF ROLL FOR MACHINERY
Paul J. Mitchell, Jr., Griffin, Ga., assignor to S W Industries, Inc., Newton, Mass., a corporation of Massachusetts
Filed Sept. 7, 1966, Ser. No. 577,724
Int. Cl. B60b 7/04, 9/00; B21b 31/08
U.S. Cl. 29—127                                    4 Claims

ABSTRACT OF THE DISCLOSURE

A rubber covered roll comprises a dimensionally stable core and a relatively hard elastomeric covering having encapsulated therein one or more plies of circumferentially extending strands. The strands, which are inert, have greater tensile strength than the elastomer. The elastomer is rubber having a preferred hardness in the range of 0 to 15, 1/8" Plastometer, and a best hardness in the range of 0 to 5, 1/8" Plastometer.

---

The present invention relates to a novel roll construction useful in a variety of machines, for example, heavy duty machines for making, handling and processing lengths of paper and textile materials, and, more particularly, to a roll having: a metallic or equivalent core, the extremities of which are journaled; and an elastomeric covering or veneer, the physical and chemical properties of which are particularly selected. Historically, difficulties have been encountered in bonding a relatively hard covering of the foregoing type to the core, particularly where relatively high pressures are generated and consequently where relatively high temperatures are generated in the covering. For example, in paper making machinery, a roll in the breaker-stack position may be subjected to a pressure in excess of 1000 pounds per lineal inch. Deformation of the covering during rotation of the roll generates internal heat, which elevates the temperature of the covering into a range typically from 180 to 200° F. Such a temperature tends to be accompanied by softening and expansion of the covering, the internal diameter of which becomes greater than the external diameter of the core, so that failure of the bond between the covering and the core tends to result. In other words, the excessive heat softens and expands the covering so that its snug fit onto the core tends to be damaged.

The primary object of the present invention is to prevent such bond failure between a relatively hard covering and a core by encapsulating strands of metal, glass or the like, which extend at least in part circumferentially of the roll, in the covering in such a way as to prevent the increase of the inner circumference of the covering when heating occurs under pressure. In effect, the strands control expansion of elastomer in the covering, at elevated temperatures, so that the covering, dependent primarily upon adhesion of its inner circumference to the core by mechanical means, is prevented at high operating pressure from detaching itself from the metal core. As will be discussed more fully below, the arrangement is such that the strands have greater tensile strength than the elastomer, the elastomer has greater elongation than the strands, and the strands are under adequate tension to prevent the elastomer from approaching its ultimate elongation prior to maximum elongation of the strands.

Other objects of the present invention will in part be obvious and will in part appear hereinafter.

For a fuller understanding of the nature and objects of the present invention, reference should be had to the following detailed disclosure, taken in connection with the accompanying drawing, wherein there is shown, as a non-limiting example, an exaggerated perspective view, partly in cross section and partly broken away, of a roll construction of the present invention.

Generally, a roll constructed in accordance with the present invention comprises: an inner core in the form of a solid or hollow cylinder composed of a metal, plastic or other dimensionally stable material; and a relatively hard elastomeric covering having encapsulated therein one or more plies of circumferentially extending strands that may be provided, for example, either by an encapsulated fabric having strands that extend longitudinally as well as circumferentially or by helically wound strands only. The strands, which may be composed either of spun short fibers or extruded solid lengths, have greater tensile strength than the elastomer of the covering, being composed of an inorganic material, for example a metallic material such as stainless steel or a vitreous material such as glass. The elastomer, ordinarily a natural or synthetic rubber having greater elongation than the strands, should not be softer than 30 1/8" Plastometer, the preferred hardness being in the range 0–15 1/8" Plastometer and best results being obtained when the hardness is in the range 0–5 1/8" Plastometer. The Plastometer hardness designation is well known in the art, as defined in A.S.T.M. Designation D– 531–56. The material of the strands is inert with respect to the material of the elastomeric mass in order to preclude chemical deterioration. The distribution, quantity, volume and surface area of the strands are such as: to prevent the hard rubber from ever reaching maximum elongation; to avoid contributing structural weakness to the hard rubber; to avoid interfering with adherence of the hard rubber directly to the core; to avoid underlying an appreciable proportional area of the hard rubber; to avoid appreciably decreasing the tensile strength of the hard rubber; to avoid appreciably decreasing the shear strength of the hard rubber; and to avoid appreciably decreasing the compression strength of the hard rubber. The strands generally are continuous in the circumferential direction and generally are evenly distributed throughout the hard rubber mass so that strain from tension, shear and compression stress is distributed along the strands and relieved from the mass. As indicated above, the invention may be practiced with a single ply of strands or more than one plies of strands with suitable thicknesses of elastomeric mass therebetween. As a practical matter, the layer of hard rubber mass between the outer surface of the core and the innermost layer of strands ranges between 0.010 to 0.150 inch so that contact between the strands and the core is avoided.

The following nonlimiting examples further illustrate the present invention.

Example I

FIG. 1 illustrates a roll 10 comprising a metal core 12 and a hard rubber covering 14. Within the hard rubber covering are two layers of fiberglass fabric reinforcement 16, 18 which are helically wound in opposite directions. These fiberglass fabric reinforcements are completely encapsulated in hard rubber covering 14 in accordance with the principles above described. The core, composed of iron, is 34 inches in diameter by 184 inches in length and the thickness of the hard rubber covering, overall is 1/2 inch. In applying the hard rubber covering to the core, the following procedure was followed. First the surface of the core was roughened by grit blasting and coated with cement in accordance with well established roll covering techniques. Next, one ply of the following hard rubber compound, 0.100 inch thick and 0–5 1/8" Plastometer, was applied:

| Component | Parts, 100 RHC |
|---|---|
| Smoked sheet | 75.0 |
| Reclaim | 50.0 |

| Component | Parts, 100 RHC |
|---|---|
| Hard rubber dust | 50.0 |
| Heavy calcined magnesia | 5.0 |
| Hydrous aluminum silicate | 70.0 |
| Sulfur | 47.0 |

Next one ply of fiberglass reinforcement was applied as a helix starting from left and advancing to right without overlap and with adjacent coils in contiguity. This fabric was composed of woven glass (sold by J. P. Stevens under the trade designation Style 1652, No. 105 finish) and was applied as a six inch wide strip having eight picks per inch in warp and fill. Next a second ply of the foregoing hard rubber compound, 0.100 inch thick and 0–5 ⅛" Plastometer, was applied. Next a second ply of fiberglass fabric, having the same specifcations as above, was wound as a helix starting from right and advancing to left. Then a third ply of the foregoing hard rubber compound applied to provide a one-half inch overall thickness. Finally, the foregoing roll cover was cured, finished and ground in accordance with well established roll manufacturing techniques.

*Example II*

The procedure of Example I was repeated except that following application of the third ply of hard rubber compound, before curing, a fourth ply of fiberglass fabric and a fourth ply of hard rubber compound were applied. The fourth ply of fiberglass fabric, having the same specifications as in Example I, was wound as a helix starting from left and advancing to right. The fourth ply of hard rubber compound had the following formulation:

| Components | Parts, 100 RHC |
|---|---|
| Smoked sheet | 100 |
| Light oil plasticizer (sold by Sun Oil Co. under the trade designation Circo) | 5.7 |
| Mineral filler | 33.4 |
| Titanium dioxide | 33.4 |
| Silica granules 80 to 100 mesh | 117 |
| Parafin wax | 0.93 |
| Benzothiazyl disulfide accelerator (sold by R. T. Vanderbilt Chemical Co. under the trade designation Altax) | 0.81 |
| Lime | 1.74 |
| Sulfur | 4.70 |

The foregoing roll cover was cured, finished and ground in accordance with well established roll manufacturing techniques.

Since certain changes may be made in the foregoing disclosure without departing from the scope of the invention herein involved, it is intended that all matter shown and described in the accompanying drawing and the foregoing specification be interpreted in an illustrative and not in limiting sense.

What is claimed is:

1. A roll comprising a dimensionally stable core and a covering, said covering being composed of a hard rubber having encapsulated therewithin between the inner and outer surfaces of said covering at least one ply of strands extending generally continuously in the circumferential direction and being generally evenly distributed, said hard rubber being in the hardness range of 0–15 ⅛" Plastometer and having greater elongation than said strands, said strands being composed of an inorganic material selected from the class consisting of metallic and vitreous materials, said strands being inert relative to said hard rubber and having a greater tensile strength than said hard rubber in order to prevent said hard rubber from reaching its maximum expanded condition when heated, the layer of hard rubber between the outer surface of said core and the adjacent ply of strands ranging from 0.010 to 0.150 inch so that contact between the strands and the core is substantially avoided, whereby structural shear, tensile and compression strengths of said hard rubber are maximized.

2. The roll of claim 1 wherein said hard rubber is within the hardness range of 0–15 ⅛" Plastometer.

3. The roll of claim 1 wherein said strands are helically wound.

4. The roll of claim 1 wherein a plurality of plies of said strands are helically wound in different directions.

References Cited

UNITED STATES PATENTS

| 1,528,956 | 3/1925 | Smith | 29—127 X |
| 2,369,635 | 2/1945 | Bacon | 29—132 X |
| 2,597,858 | 5/1952 | Freedlander | 29—132 X |

FOREIGN PATENTS

| 651,969 | 4/1951 | Great Britain. |
| 844,817 | 8/1960 | Great Britain. |

BILLY J. WILHITE, *Primary Examiner.*

U.S. Cl. X.R.

29—131, 132